United States Patent
Talbert et al.

(10) Patent No.: US 10,877,741 B2
(45) Date of Patent: Dec. 29, 2020

(54) CONTAINERIZED SYSTEMS AND METHODS FOR CUSTOMER PREMISES EQUIPMENT

(71) Applicant: Verizon Patent and Licensing Inc., Arlington, VA (US)

(72) Inventors: Michael Talbert, Nazareth, PA (US); Meaghan Leong, Cohasset, MA (US); Christina L. Fyock, Sudbury, MA (US); Aldrich Gamboa, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 10 days.

(21) Appl. No.: 16/109,077

(22) Filed: Aug. 22, 2018

(65) Prior Publication Data
US 2020/0065085 A1 Feb. 27, 2020

(51) Int. Cl.
*G06F 8/65* (2018.01)
*H04L 29/08* (2006.01)

(52) U.S. Cl.
CPC .............. *G06F 8/65* (2013.01); *H04L 67/34* (2013.01)

(58) Field of Classification Search
None
See application file for complete search history.

(56) References Cited

U.S. PATENT DOCUMENTS

| | | |
|---|---|---|
| 2012/0005255 A1* | 1/2012 | Cherukuri .............. G06Q 10/10 709/203 |
| 2012/0174095 A1* | 7/2012 | Natchadalingam ....... G06F 8/65 718/1 |
| 2018/0288129 A1* | 10/2018 | Joshi ....................... H04L 43/08 |
| 2019/0067558 A1* | 2/2019 | Floyd ...................... H01L 43/02 |
| 2019/0180033 A1* | 6/2019 | Born .................... G06F 21/6209 |
| 2019/0207823 A1* | 7/2019 | Isci ........................... G06F 8/60 |
| 2019/0235897 A1* | 8/2019 | Goel ........................ G06F 8/61 |
| 2019/0391833 A1* | 12/2019 | Muramatti .......... G06F 11/0793 |

* cited by examiner

Primary Examiner — Wynuel S Aquino (57) ABSTRACT

A CPE device may include a communication component that is configured to communicatively couple to a network provided by a network service provider. The network may include a management platform for facilitating deployment of updates, or facilitating provisioning of services and deployment of service applications corresponding to the services. The CPE device may host a containerized system that includes an operating system, and a plurality of containers configured to share resources of the operating system. Each container, of the plurality of containers, may be configured to contain a respective service application. The operating system may be configured to communicate with the management platform to coordinate receiving of particular updates for the containerized system or the CPE device, or to coordinate provisioning of particular services, and deployment of particular service applications corresponding to the particular services, to the CPE device.

20 Claims, 7 Drawing Sheets

Containerized System for CPE Device

| Secure container 112-1 | ... | Secure container 112-M |
|---|---|---|
| Software container host 110 (Abstraction Layer) ||| 
| Common data store 108 |||
| Hardened operating system 106 (core routing functionality) |||
| Hardened kernel 104 (with common device drivers) |||
| Secure bootloader 102 |||

CONTAINERIZED SYSTEMS AND METHODS FOR CUSTOMER PREMISES EQUIPMENT

BACKGROUND

Many network service providers offer a variety of types of network services. For example, a network service provider may provide a fiber optic-based network service, a cellular-based network service (e.g., via a Fourth Generation (4G) network, a Fifth Generation (5G) network (e.g., for 5G fixed wireless access), and/or another next generation network), low-cost Internet (LCI) service, and/or the like. These services typically have different installation, provisioning, diagnostics, telemetry, and performance monitoring requirements.

DETAILED DESCRIPTION OF PREFERRED EMBODIMENTS

The following detailed description of example implementations refers to the accompanying drawings. The same reference numbers in different drawings may identify the same or similar elements.

Network service providers may provide networks that are stovepipe systems—e.g., for a given network, multiple organizations may implement different operations support systems and different business support systems for managing various network elements, such as optical networking, edge routing, and core routing. Sharing of information, between operations of different service segments, such as fiber optic-based Internet service, low-cost internet (LCI) service, and 5G fixed wireless service, is thus limited, which hinders timely and efficient development of new network protocols, network management functionalities, operational services features, and/or the like.

Some implementations, described herein, provide a containerized system (e.g., a container stack) that is capable of being hosted by customer premises equipment (CPE) devices provided by a network service provider. In some implementations, the containerized system may be hosted by CPE devices across multiple network service segments. In some implementations, the containerized system may be hosted by CPE devices in which certain functionalities are provided via different hardware modules (e.g., a router module, a wide area network (WAN) module, a WLAN module, and/or the like). In some implementations, the containerized system may provide multiple containers, enabling modularity. In some implementations, a container may be configured to contain an application (e.g., an application that provides core functionality), middleware, and/or a service application corresponding to a service provided by the network service provider (e.g., an add-on service application corresponding to an add-on service or microservice), such as a security service, a firewall service, a voice service, a voice-assist service, a video service, a parental controls service, a network management service (e.g., relating to a self-organizing network (SON) and/or the like), a content distribution service, and/or the like.

In some implementations, a management platform, that includes a provisioning and orchestration system and support systems (e.g., such as an automated operations support system (OSS), an automated business support system (BSS), and/or the like), may be provided. In some implementations, the management platform may be implemented as a cloud-based platform in a network provided by the network service provider. Alternatively, in some implementations, the management platform may be implemented as a non-cloud-based platform or a hybrid platform that is partially cloud-based and partially non-cloud-based.

In some implementations, the management platform may be configured to coordinate with a network controller (e.g., a base network controller in the network) to facilitate deployment of updates (e.g., patches, secure packages, and/or the like) to containerized systems and/or CPE devices, and to facilitate provisioning of services, and deployment of corresponding service applications, to containerized systems and/or CPE devices. In some implementations, the network controller may be configured to provide dynamic telemetry functionality for identifying service-related issues.

In this way, a network service provider may implement a software architecture that is common to (e.g., the same for) a variety of hardware devices, and that can be tailored to meet customer needs across multiple service segments (e.g., fiber optic-based Internet service, low-cost Internet service, 5G fixed wireless service, and/or the like). This permits a network service provider to develop, and utilize, a common BSS, a common OSS, a common telemetry solution, and/or a common surveillance solution, across all service segments, which simplifies the development of new protocols, network management functionalities, operational services features, new ordering systems, new billing systems, and/or the like, thereby improving overall deployment efficiency.

Containerization also provides a standalone environment, which enables flexible deployment of core and/or add-on functionality (e.g., since software code changes are not needed when new hardware devices are introduced, or when a certain hardware component, such as a processor core, is changed). This allows for flexibility from a design perspective and agility from a deployment perspective, and an overall more flexible CPE device lifecycle.

The capability of supporting add-on services (e.g., microservices), in conjunction with a management platform that facilitates provisioning of such services and deployment of corresponding service applications, as well as deployment of core functionality updates for containerized systems, also provides a more flexible approach to the embedded software development cycle (since containerization abstracts service applications away from hardware dependencies).

Further, dynamic telemetry permits a network service provider to proactively identify issues relating to a subscriber's services, and provide appropriate notifications to the subscriber and/or to technical support team(s). Communicating performance-impacting events to subscribers provides a paradigm shift in service levels, since a subscriber may be made aware of a network outage and/or the like without having to contact customer support (and endure through a time-intensive diagnosis of the outage). This provides improved segmentation, and diagnoses, of service-related issues, which allows for more efficient issue resolution.

Figure 1A:
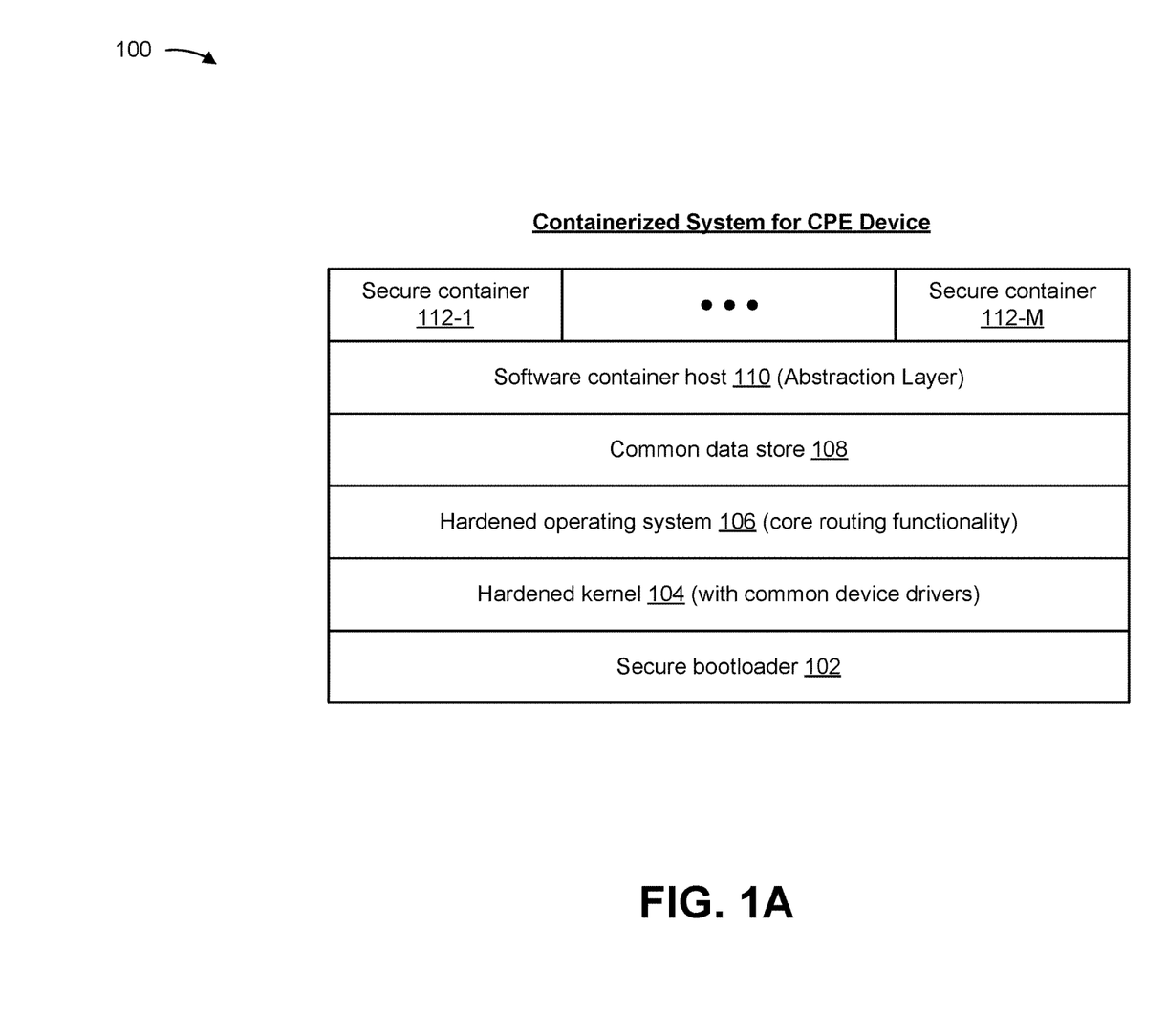
FIGS. 1A-1C are diagrams of an example implementation described herein.
Figure 1B:
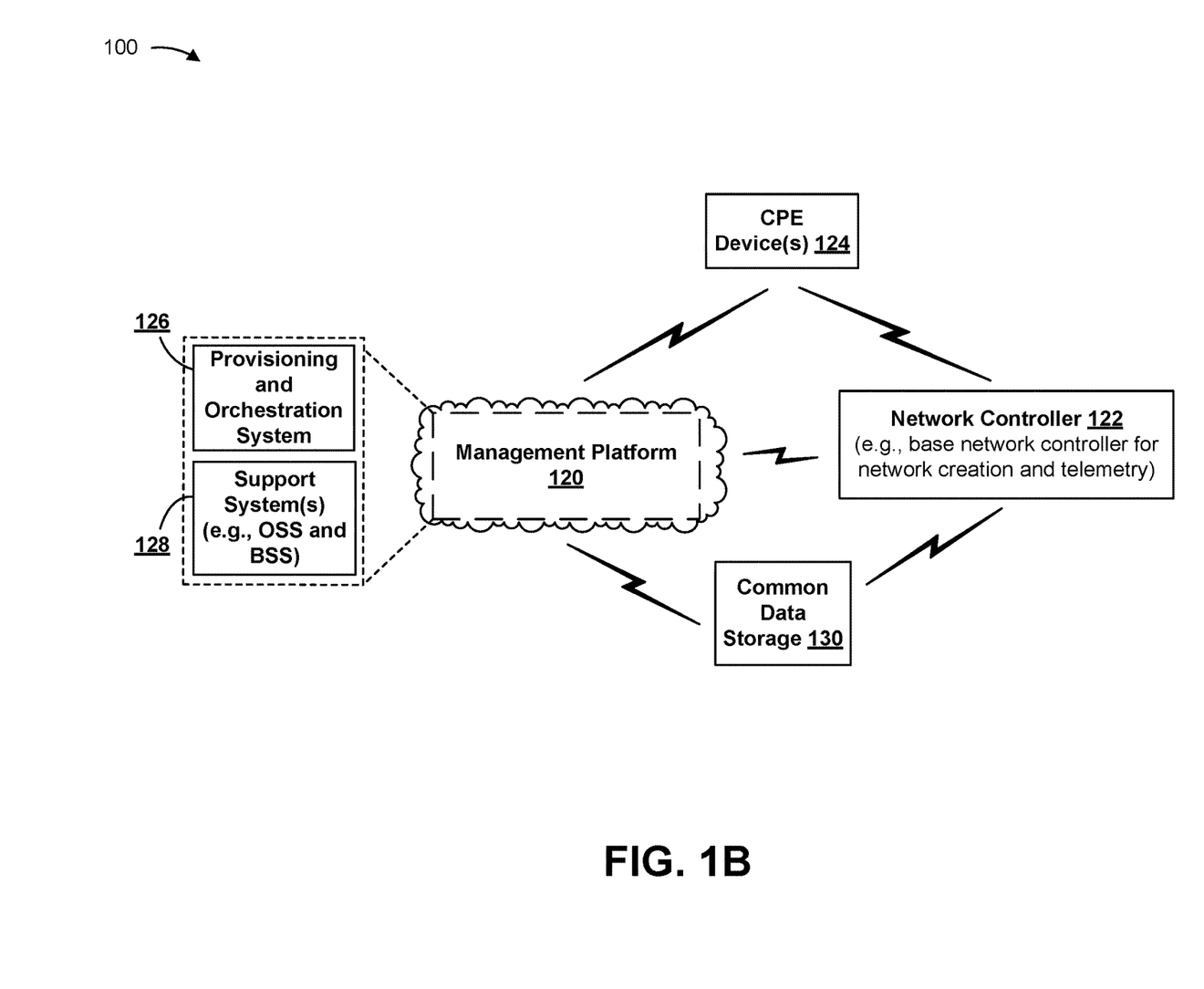
Figure 1C:
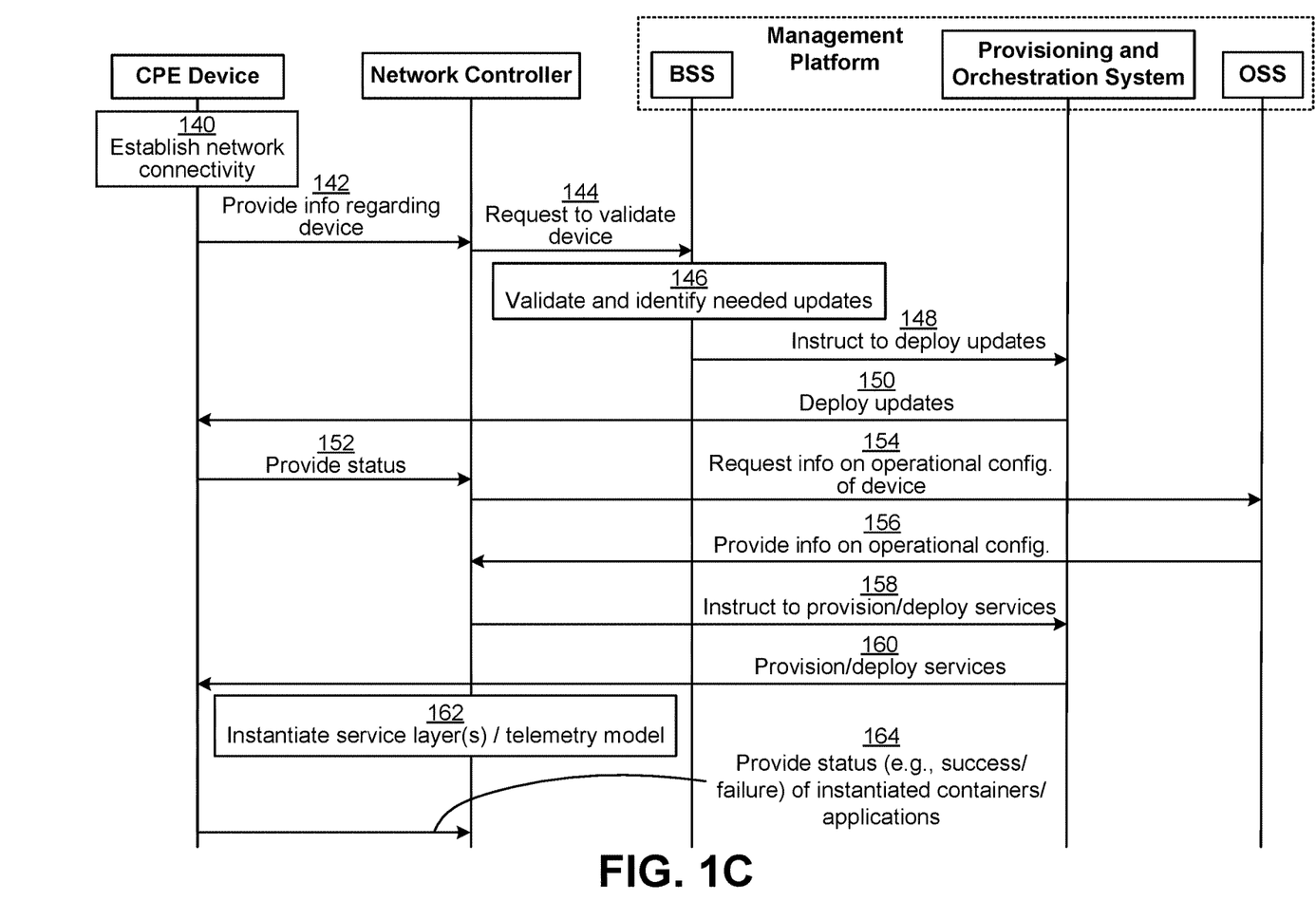

FIGS. 1A-1C are diagrams of an example implementation 100 described herein. FIG. 1A is a diagram of an example containerized system that may be deployed to, and/or hosted by, a CPE device. For example, the containerized system may be hosted by a hardware device located at a subscriber's premises (e.g., a residential home, a multiple dwelling unit, a business building, and/or the like), such as a router module, a WAN module, a WLAN module (e.g., a Wi-Fi module), a voice services module, an Internet-of-Things (IoT) module, a storage module, a femtocell module, a microcell module, a picocell module, a digital assistant module, a video module (e.g., for streaming video), a content recorder device (e.g., a digital video recorder and/or the like), and/or the like.

In some implementations, the CPE device may be communicatively coupled to a network that includes various network systems, such as a hub system, a transport system, an edge system, and a core network system. In some implementations, the network may include an optical fiber network (e.g., a passive optical network ("PON"), a gigabit PON ("GPON"), a next generation PON ("NGPON"), or a second generation NGPON or 40 Gigabit-capable PON ("NGPON2")), an Ethernet network, and/or a wireless network (e.g., a 4G network, a 5G network, a network based on a Long-Term Evolution Category M1 (LTE Cat-M1) interface, a Narrowband Internet-of-Things (NB-IoT) network, etc.). In a case where the network is a unified network, the network may include a unified hub system, a unified transport system, a multi-service edge system, and a converged core network system (e.g., that includes a Multiprotocol Label Switching (MPLS) core, an ultra-long-haul (ULH) core, and/or the like).

As shown in FIG. 1A, the containerized system may include a secure bootloader 102, a hardened kernel 104 (e.g., with one or more device drivers, such as common device drivers), a hardened operating system 106, a common data store 108 (e.g., implemented in memory), a software container host 110, and secure containers 112-1 through 112-M (M≥1) (hereinafter referred to collectively as "secure containers 112," and individually as "secure container 112").

In some implementations, hardened operating system 106 may be configured to provide core routing functionality (e.g., common routing functionality). In some implementations, hardened operating system 106 may be configured to support secure container deployments. In some implementations, hardened kernel 104 may provide hardened operating system 106 with access to the device driver(s) as well as a high-performance routing solution. In some implementations, the software container host 110 may be configured to manage use of containerized objects and/or discontinued use of the containerized objects.

In some implementations, common data store 108 may be configured to store information regarding a hardware configuration and/or a software configuration of the CPE device, parametric objects associated with services, key performance indicator (KPI) thresholds associated with services, and/or the like. In some implementations, the containerized system may update common data store 108 based on changes to the CPE device. For example, the containerized system may update common data store 108 based on changes to hardware components of the CPE device (e.g., the addition, or removal, of a network interface component (e.g., a WAN interface, a backhaul interface, such as a Multimedia over Coax Alliance (MoCA) interface, and/or the like), the addition, or removal, of an IoT interface, and/or the like). As another example, the containerized system may update common data store 108 based on changes to services provisioned to the CPE device (e.g., the addition, or removal, of service applications), such as by managing (e.g., activating or deactivating) parametric objects associated with such services, KPI thresholds associated with such services, and/or the like.

In some implementations, the containerized system may be capable of receiving, and deploying, updates (e.g., secure packages containing drivers, middleware, and/or other core functionalities or services) for the containerized system or for the CPE device. In some implementations, the containerized system may be configured to verify whether a received update is authentic prior to deploying the update. For example, the containerized system may be configured to determine whether a received update is signed by a network service provider, or is otherwise approved by the network service provider, prior to deploying the update. In this way, the containerized system may manage and/or control such deployment to safeguard against anomalous actions, security breaches, performance issues, and/or functional issues.

In some implementations, the containerized system may be configured to initiate (e.g., upon, or after, start-up of the CPE device, based on user input, and/or the like) a secure container environment that permits aggregation of services (and related elements). Secure container 112 may contain any type of application, such as an application associated with a core functionality, an add-on service (e.g., a microservice), and/or the like. For example, secure container 112 may contain a security service application, a voice service application (e.g., for a far-field voice-controlled intelligent personal assistant service and/or the like), a network management service application (e.g., relating to a SON and/or the like), a content distribution service application, a parental controls service application, a secure domain name service (DNS) application, and/or the like.

Implementing a containerized environment in a CPE device, as described above, provides modularity, which enables flexible, and more efficient, application development and deployment.

FIG. 1B is a diagram of an example environment in which a containerized system, hosted by a CPE device, may be implemented. As shown in FIG. 1B, a management platform 120 may be provided (e.g., as a cloud-based platform) in a network service provider's network, and arranged to be communicatively coupled to a network controller 122 (e.g., a base network controller) in the network and to CPE devices 124 (e.g., including the CPE device described above in connection with FIG. 1A). As shown in FIG. 1B, management platform 120 may include a provisioning and orchestration system 126 and various support systems 128, such as an OSS and a BSS.

In some implementations, management platform 120 may manage the configuration of a containerized system hosted by a CPE device 124. For example, management platform 120 may (e.g., based on a subscriber profile, based on user request, automatically, and/or the like) deploy updates to the containerized system or CPE device 124, and provision services, and deploy corresponding service applications, to the containerized system (e.g., for instantiation in a container of the containerized system). In some implementations, in a case where there are multiple CPE devices 124 in a subscriber's premises, and each such CPE device 124 hosts a respective containerized system, management platform 120 may be configured to manage each of the containerized systems.

In some implementations, network controller 122 may manage network paths throughout the network. In some implementations, network controller 122 may manage network creation and telemetry. In some implementations, network controller 122 may be configured to instantiate a network path when a new service is defined. This permits a network path to be driven across the various systems of the network.

In various implementations, management platform 120 may coordinate with the containerized system and network controller 122 to deploy updates for the containerized system or CPE device 124, and to provision services, and deploy corresponding service applications, to the containerized system.

In some implementations, network controller 122 may provide remote management of CPE devices 124 via telemetry data. In some implementations, telemetry data may include surveillance information, diagnostic information, information relating to KPIs, and/or the like.

In some implementations, network controller 122 may instantiate a proactive telemetry model in which telemetry data is pushed by a CPE device 124 to network controller 122. This is in contrast to prior, reactive models, where a network provider pulls data from a CPE device when a network issue is identified. In the proactive telemetry model, a CPE device 124 (e.g., a containerized system hosted by CPE device 124) may provide telemetry data to network controller 122 (e.g., over a particular bus of network controller 122) periodically (e.g., once per minute, once per 5 minutes, once per hour, and/or the like), upon thresholds (e.g., KPI thresholds) being satisfied (e.g., breached), and/or the like. In some implementations, the proactive telemetry model may be defined when the containerized system is configured in CPE device 124. For example, parametric objects, KPI thresholds, and/or the like, relating to various services, may be pre-stored in the common data store of the containerized system (e.g., common data store 108 shown in FIG. 1A) when the containerized system is configured in CPE device 124. In such cases, network controller 122 may instantiate the proactive telemetry model for a service (e.g., when the service is to be provisioned) by instantiating the parametric objects, KPI thresholds, and/or the like needed for the service. In some implementations, the proactive telemetry model may be dynamically instantiated upon, or after, establishing service layer(s).

In some implementations, the containerized system may be configured to report, to network controller 122, on the operational status of a service (e.g., by providing telemetry data relating to associated parametric objects and/or KPI thresholds). This enables network controller 122 to perform any needed actions based on the operational status. For example, in a case where the containerized system reports that a quantity of packets lost satisfies a packet loss threshold, network controller 122 may perform an appropriate action, such as logging the packet loss issue, determining a solution for the issue, and/or the like.

In some implementations, and as described in more detail below, network controller 122 may, in a case where a KPI threshold is satisfied (e.g., is breached), automatically provide a notification to an affected subscriber. Additionally, or alternatively, and in some implementations, network controller 122 may automatically provide a notification to the OSS or to an appropriate technical support team. Communicating performance-impacting events to subscribers provides a paradigm shift in service levels, since a subscriber may be made aware of a network outage and/or the like without having to contact customer support. This provides improved segmentation, and diagnoses, of service-related issues, which allows for more efficient issue resolution.

In some implementations, telemetry data, received by network controller 122, may be provided to a common data storage 130 that is accessible to the OSS and/or the BSS for use by the OSS and/or the BSS (e.g., to facilitate service instantiation and/or the like).

In this way, network controller 122 may provide telemetry data analysis and processing that enables early detection of issues relating to services subscribed to by a subscriber.

In various implementations, provisioning and orchestration system 126 may provide support for base firmware (e.g., specific to each service segment, such as fiber optic-based Internet service, 5G fixed wireless service, low-cost Internet service, network services for small companies and/or medium-sized companies, and/or the like), middleware support (e.g., for hardware modules, for protocols (e.g., SON and/or the like), for telemetry, relating to the Digital Living Network Alliance (DLNA), and/or the like), and/or application support (e.g., relating to services, such as security services, firewall services, parental controls services, content delivery services, and/or the like).

In some implementations, provisioning and orchestration system 126 may be configured to provide service provisioning. Service provisioning may include provisioning various physical resources, virtual resources, and application resources when a new service is to be added for a subscriber. In some implementations, provisioning and orchestration system 126 may be configured to provision general data services (e.g., routing services) as needed, such as those relating to voice services, voice-assist services, deep packet inspection (DPI), security services, secure domain name service (DNS), a content delivery network (CDN) service, and/or the like.

In some implementations, provisioning and orchestration system 126 may be configured to provide resource management. Resource management may include management of resources allocated for services available to a subscriber or associated CPE device. In some implementations, provisioning and orchestration system 126 may be configured to conduct service monitoring and/or performance monitoring. Service monitoring and/or performance monitoring may include monitoring a service, and resources allocated for the service, to ensure that service guidelines and/or performance guidelines are met.

In some implementations, provisioning and orchestration system 126 may be configured to provide application and service management. Application and service management may include monitoring application and service performance as well as detection and diagnosis of performance issues and implementing remedies (e.g., rebooting and/or dynamically assigning or re-routing resources) to ensure that performance guidelines are met.

In some implementations, the OSS, of management platform 120, may provide automated management of operational parametric data (e.g., needed to operationally define each service), automated management of performance metrics, KPI thresholds, and/or the like (e.g., needed to monitor the performance of each service), management of alerts and/or event notifications (e.g., alerts and/or notifications based on operational parametric thresholds or performance thresholds being satisfied), and/or overall automated systems management (e.g., such as management of network resources, server devices, storage, license, resource usage, versioning, updates, patches, backups, security (e.g., antivirus tools/updates and/or the like), and/or the like).

In some implementations, the BSS, of management platform 120, may provide various functionality, such as order processing (e.g., traditional order processing, staging of services in the provisioning and orchestration system, and/or the like), service validation (e.g., confirmation that delivery of service has met functional expectations, such as event orchestration being successful and/or all elements of event orchestration across all functional levels meeting expectations), fraud prevention (e.g., theft prevention mechanisms and security mechanisms for protecting subscriber information), performing service renewals and/or providing corresponding notifications (e.g., notifications to subscribers or billing systems for continued service), product catalog management (e.g., high-level product cataloguing of deployable services and variants of such services), billing (e.g., to account for overall subscriber resource usage), and/or the like.

In some implementations, the containerized system may be configured to communicate (e.g., upon, or after, establishing connectivity with network controller 122, upon, or after, start-up of CPE device 124, based on user input, periodically, and/or the like) information to network controller 122. For example, the information may include data regarding a hardware configuration of CPE device 124 (e.g., data regarding a version of CPE device 124, a type of network to which CPE device 124 is configured to communicatively couple, and/or the like), data regarding a configuration of the containerized system (e.g., data regarding a version of the containerized system, capabilities of the containerized system, and/or the like), data regarding secure packages installed in the containerized system, data regarding services deployed to CPE device 124, and/or the like. In some implementations, the containerized system may communicate the information based on a data modeling language, such as the YANG model for the Network Configuration Protocol (NETCONF), and/or the like.

In some implementations, network controller 122 may instantiate services for new subscribers. For example, in a case where a new subscriber, associated with a CPE device 124, subscribes to a particular service (e.g., Internet service) (e.g., as determined by the BSS of management platform 120), network controller 122 may instantiate the service across the various systems of the network. Here, network controller 122 may provide, to the containerized system hosted by CPE device 124, an indication that the service is being instantiated, information regarding relevant parametric objects on which the containerized system is to report to network controller 122, information regarding relevant KPI thresholds, and/or the like. The containerized system may be configured to monitor the service, and generate, and provide, reports to network controller 122 based on the monitoring.

In some implementations, network controller 122 may facilitate requests for add-on services. For example, in some cases, a subscriber may input, to CPE device 124, such as a voice service module, a request (e.g., via a voice command) to secure the subscriber's premises with a particular service—e.g., a security service to protect the subscriber's premises. In such cases, the containerized system may provide the request to network controller 122. Here, network controller 122 may communicate with the OSS to determine whether CPE device 124 is authorized to receive such a service. In a case where the OSS indicates, to network controller 122, that CPE device 124 is authorized to receive such a service, network controller 122 may command provisioning and orchestration system 126 to deploy a corresponding service application to CPE device 124, and may provide information to CPE device 124, such as information indicating that the service is being instantiated, information regarding parametric objects on which the containerized system is to report to network controller 122, information regarding KPI thresholds, and/or the like.

As another example, in some cases, a subscriber may request the network service provider (e.g., via phone, via e-mail, via one or more selections submitted via an online account management platform, and/or the like) to provide a particular service. In this example, a customer representative (e.g., tasked with processing the request) may communicate with the OSS to determine whether the subscriber is authorized to receive such a service. In a case where the OSS indicates, to network controller 122, that CPE device 124 is authorized to receive such a service, network controller 122 may command provisioning and orchestration system 126 to deploy a corresponding service application to CPE device 124, and may provide, to the containerized system, an indication that the service is being instantiated, information regarding relevant parametric objects on which the containerized system is to report to network controller 122, information regarding relevant KPI thresholds, and/or the like.

In any case, the containerized system may be configured to monitor a service, and generate, and provide, reports to network controller 122 based on the monitoring. In some implementations, network controller 122 may, based on such reports, cause one or more notifications to be provided (e.g., in the form of a text message, an e-mail, a phone call, through a network service provider application (e.g., a mobile application), etc.), workflow tasks in a task management platform, and/or the like) to one or more parties, such as, for example, the subscriber associated with CPE device 124 (e.g., to alert the subscriber to any issues) and/or one or more technical support teams or representatives (e.g., to facilitate resolution of the issues).

FIG. 1C is a signal diagram showing an example high-level call flow involving a CPE device (e.g., CPE device 124), a network controller (e.g., network controller 122), and a management platform (e.g., management platform 120), which may include a provisioning and orchestration system (e.g., provisioning and orchestration system 126) and support system(s) (e.g., support system(s) 128, including an OSS and a BSS, such as those described above in connection with FIG. 1B above). As shown in FIG. 1C, and as shown by reference number 140, the CPE device may establish connectivity with a network. As shown by reference number 142, the CPE device (e.g., the containerized system hosted by the CPE device) may provide, to the network controller, information regarding the CPE device (e.g., information regarding a hardware configuration of the CPE device, information regarding the containerized system, and/or the like). As shown by reference number 144, the network controller may submit a request to the BSS to validate the CPE device (e.g., to determine whether the CPE device is an authorized device).

As shown by reference number 146, the BSS may validate the CPE device and identify needed updates (e.g., secure packages, such as drivers, middleware applications, and/or the like). As shown by reference number 148, the BSS may instruct the provisioning and orchestration system to deploy such updates to the CPE device. As shown by reference number 150, the provisioning and orchestration system may deploy the updates to the CPE device (e.g., to the containerized system) for installation.

As shown by reference number 152, the CPE device may provide information regarding a status (e.g., success or failure of the installation of the updates) to the network controller. In some implementations, the CPE device may additionally provide information regarding the capabilities of the CPE device. In some implementations, the information may identify the capabilities of the CPE device that correspond only to services to which an associated subscriber is subscribed. As shown by reference number 154, the network controller may submit a request to the OSS for information regarding an operational configuration of the CPE device—e.g., to determine whether any services (e.g., microservices) need to be provisioned for the CPE device. As shown by reference number 156, the OSS may respond to the network controller with information regarding the operational configuration of the CPE device.

As shown by reference number 158, the network controller may instruct the provisioning and orchestration system to provision the CPE device with appropriate services based on the information regarding the operational configuration. As shown by reference number 160, the provisioning and orchestration system may provision the CPE device with the appropriate services and deploy corresponding service applications for instantiation in one or more containers of the containerized system. As shown by reference number 162, the network controller may instantiate service layers(s) across various systems of the network, and instantiate a proactive telemetry model for the CPE device for monitoring the performance of the services. In some implementations, the telemetry model may be specific to a hardware configuration (e.g., capabilities of a CPE device) and the services to which the associated subscriber is subscribed. This limits the amount of telemetry data that may need to be generated and communicated to the network controller, which conserves computing resources and power resources of the CPE device, and decreases network traffic, which improves overall network efficiency. As shown by reference number 164, the CPE device may provide, to the network controller, information regarding the status (e.g., success/failure) of the instantiated containers/applications.

In some implementations, the CPE device (e.g., the containerized system) may, upon or after detecting change in a configuration of the CPE device (e.g., a hardware configuration, a configuration of the containerized system, and/or the like), provide information regarding the change to the network controller. In such cases, the high-level call flow may return to reference number 144 and/or reference number 152 to determine whether to deploy additional updates and/or provision additional services and deploy additional corresponding service applications.

In this way, a service application may be dynamically deployed, to a CPE device, as needed or upon request, and monitored for performance, and information regarding a status of and/or issues with the corresponding service (e.g., such as relating to a wire being unplugged or damaged in the subscriber's premises or elsewhere, a service-related feature not functioning properly, and/or the like) may be reported, in real-time (or near real-time), to a network service provider. This provides the network service provider with up-to-date information on any issues that may need to be resolved, which enables the network service provider (e.g., a technical support representative and/or the like) to identify, and perform actions concerning, end-to-end service layer issues. This allows for faster resolution of subscriber complaints, and, in a case where a notification of a service issue is also automatically provided to a subscriber, obviates a need for the subscriber to contact customer service, thereby improving user experience, and conserving time and network resources that may otherwise need to be expended to address a subscriber's complaint.

As indicated above, FIGS. 1A-1C are provided merely as examples. Other examples are possible and may differ from what was described with regard to FIGS. 1A-1C.

For example, in practice, there may be additional components, elements, devices, and/or networks, fewer components, elements, devices, and/or networks, different components, elements, devices, and/or networks, or differently arranged components, elements, devices, and/or networks than those variously shown in FIGS. 1A-1C. Furthermore, two or more components, elements, devices, and/or networks shown in one or more of FIGS. 1A-1C may be implemented within a single component, element, device, and/or network, or a single component, element, device, and/or network shown in one or more of FIGS. 1A-1C may be implemented as multiple, distributed components, elements, devices, and/or networks.

Figure 2:
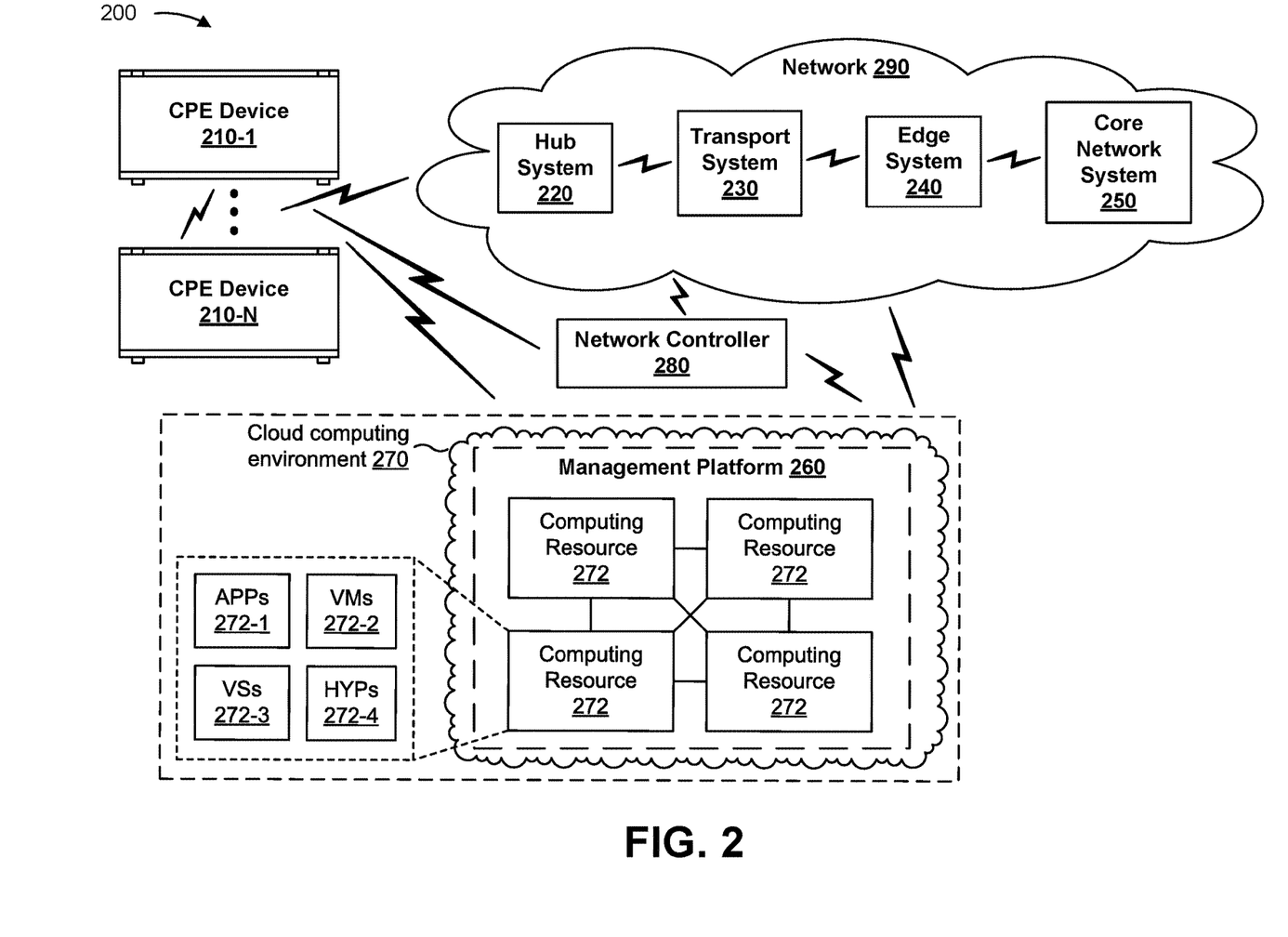
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more CPE devices 210-1 through 210-N (N≥1) (hereinafter referred to collectively as "CPE devices 210," and individually as "CPE device 210"), a hub system 220, a transport system 230, an edge system 240, a core network system 250, a management platform 260, a network controller 280, and a network 290. Devices of environment 200 may interconnect via wired connections, wireless connections, or a combination of wired and wireless connections.

CPE device 210 includes one or more devices capable of receiving, generating, storing, processing, and/or providing data associated with hub system 220, transport system 230, edge system 240, core network system 250, management platform 260, and/or network controller 280. For example, CPE device 210 may include a hardware device located at a subscriber's premises (e.g., a residential home, a multiple dwelling unit, a business building, and/or the like), such as a router module, a WAN module, a WLAN module (e.g., a Wi-Fi module), a voice services module, an IoT module, a storage module, a femtocell module, a microcell module, a picocell module, a digital assistant module, a video module (e.g., for streaming video), a content recorder device (e.g., a digital video recorder and/or the like), and/or the like. In some implementations, CPE device 210 may host a containerized system, as described elsewhere herein. In some implementations, CPE device 210 may be communicatively coupled to hub system 220 via wired connections (e.g., based on fiber (e.g., such as in a PON, an NGPON, and NGPON2, and/or the like), based on copper (e.g., such as in an Ethernet network), and/or the like) or wireless connections (e.g., a 4G network, a 5G network, a network based on an LTE Cat-M1 interface, an NB-IoT network, etc.). In some implementations, CPE device 210 may correspond to CPE device 124, described above.

Hub system 220 includes one or more devices capable of receiving, generating, storing, processing, and/or providing data associated with CPE device 210, transport system 230, edge system 240, core network system 250, management platform 260, and/or network controller 280. For example, hub system 220 may include one or more computing devices, server devices, routers, switches, firewalls, and/or the like for exchanging data between CPE device 210 and transport system 230. In some implementations, hub system 220 may include an access aggregation hub configured to aggregate traffic (e.g., received from, or destined to, CPE device 210) transmitted over different network types.

Transport system 230 includes one or more devices capable of receiving, generating, storing, processing, and/or providing data associated with CPE device 210, hub system 220, edge system 240, core network system 250, management platform 260, and/or network controller 280. For example, transport system 230 may include one or more computing devices, server devices, routers, switches, firewalls, and/or the like for exchanging data between hub system 220 and edge system 240. In some implementations, in a case where hub system 220 is implemented as an access aggregation hub, transport system 230 may be implemented as a unified transport system for traffic received from, or destined to, the access aggregation hub.

Edge system 240 includes one or more devices capable of receiving, generating, storing, processing, and/or providing data associated with CPE device 210, hub system 220, transport system 230, core network system 250, management platform 260, and/or network controller 280. For example, edge system 240 may include one or more computing devices, server devices, routers, switches, firewalls, and/or the like for exchanging data between transport system 230 and core network system 250. In some implementations, in a case where hub system 220 is implemented as an access aggregation hub, and transport system 230 is implemented as a unified transport system, edge system 240 may be implemented as a multi-service edge system (e.g., a regional hub) for routing and/or processing traffic received from, or destined to, the unified transport system. In some implementations, edge system 240 may be capable of supporting a ULH core network (e.g., a ULH Dense Wavelength Division Multiplexing (DWDM) transport optical network configured to carry Internet Protocol (IP), Multiprotocol Label Switching (MPLS), and Synchronous Optical Network/Synchronous Optical Hierarchy (SONET/SDH) services).

Core network system 250 includes one or more devices capable of receiving, generating, storing, processing, and/or providing data associated with CPE device 210, hub system 220, transport system 230, edge system 240, management platform 260, and/or network controller 280. For example, core network system 250 may include an MPLS core network, a ULH core network, and/or the like, and may include one or more computing devices, server devices, routers, switches, firewalls, and/or the like for exchanging data between edge system 240 and an external network (not shown). In some implementations, in a case where hub system 220 is implemented as an access aggregation hub, transport system 230 is implemented as a unified transport system, and edge system 240 is implemented as a multi-service edge system, core network system 250 may be implemented as a converged core network system for routing and/or processing traffic received from, or destined to, the multi-service edge system.

Management platform 260 includes one or more devices capable of receiving, generating, storing, processing, and/or providing data associated with CPE device 210, hub system 220, transport system 230, edge system 240, core network system 250, and/or network controller 280. In some implementations, management platform 260 may include a provisioning and orchestration system and various support systems, such as a BSS and an OSS, as described elsewhere herein. In some implementations, management platform 260 may communicate with a network controller (e.g., network controller 280) to facilitate deployment of updates for CPE devices (e.g., CPE devices 210) and/or containerized systems hosted by the CPE devices, and/or facilitate provisioning of services, and deployment of corresponding service applications, to the CPE devices, as described elsewhere herein. In some implementations, management platform 260 may correspond to management platform 120, described above.

Management platform 260 may include a server device or a group of server devices. In some implementations, as shown, management platform 260 can be hosted in cloud computing environment 270. For example, management platform 260 may be implemented as a cloud-based platform in edge system 240. Notably, while implementations described herein describe management platform 260 as being hosted in cloud computing environment 270, in some implementations, management platform 260 is not cloud-based or can be partially cloud-based.

Cloud computing environment 270 includes an environment that delivers computing as a service, whereby shared resources, services, etc. can be provided to CPE device 210 and/or one or more other management platforms 260. Cloud computing environment 270 can provide computation, software, data access, storage, and/or other services that do not require end-user knowledge of a physical location or low latency requirements and configuration of a system and/or a device that delivers the services. As shown, cloud computing environment 270 can include a set of computing resources 272.

Computing resource 272 includes one or more personal computers, workstation computers, server devices, or another type of computation and/or communication device. In some implementations, computing resource 272 can host management platform 260. In some implementations, cloud resources can include compute instances executing in computing resource 272, storage devices provided in computing resource 272, data transfer devices provided by computing resource 272, etc. In some implementations, computing resource 272 can communicate with other computing resources 272 via wired connections, wireless connections, or a combination of wired and wireless connections.

As further shown in FIG. 2, computing resource 272 can include a group of cloud resources, such as one or more applications ("APPs") 272-1, one or more virtual machines ("VMs") 272-2, virtualized storage ("VSs") 272-3, one or more hypervisors ("HYPs") 272-4, and/or the like.

Application 272-1 includes one or more software applications that can be provided to or accessed by CPE device 210. Application 272-1 can eliminate a need to install and execute the software applications on CPE device 210. For example, application 272-1 can include software associated with management platform 260 and/or any other software capable of being provided via cloud computing environment 270. In some implementations, one application 272 1 can send/receive information to/from one or more other applications 272-1, via virtual machine 272-2.

Virtual machine 272-2 includes a software implementation of a machine (e.g., a computer) that executes programs like a physical machine. Virtual machine 272-2 can be either a system virtual machine or a process virtual machine, depending upon use and degree of correspondence to any real machine by virtual machine 272-2. A system virtual machine can provide a complete system platform that supports execution of a complete operating system (OS). A process virtual machine can execute a single program, and can support a single process. In some implementations, virtual machine 272-2 can execute on behalf of a user (e.g., CPE device 210) and/or on behalf of one or more other management platforms 260, and can manage infrastructure of cloud computing environment 270, such as data management, synchronization, or long-duration data transfers.

Virtualized storage 272-3 includes one or more storage systems and/or one or more devices that use virtualization techniques within the storage systems or devices of computing resource 272. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 272-4 provides hardware virtualization techniques that allow multiple operating systems (e.g., "guest operating systems") to execute concurrently on a host computer, such as computing resource 272. Hypervisor 272-4 can present a virtual operating platform to the guest operating systems, and can manage the execution of the guest operating systems. Multiple instances of a variety of operating systems can share virtualized hardware resources.

Network controller 280 includes one or more devices capable of receiving, generating, storing, processing, and/or providing data associated with CPE device 210, hub system 220, transport system 230, edge system 240, core network system 250, and/or management platform 260. For example, network controller 280 may include one or more computing devices, server devices, routers, switches, firewalls, and/or the like. In some implementations, network controller 280 may communicate with a management platform (e.g., management platform 260) and CPE devices (e.g., CPE devices 210), or containerized systems hosted by the CPE devices, to facilitate provisioning of services and/or deployment of corresponding service application, as described elsewhere herein. In some implementations, network controller 280 may communicate with the CPE devices, or containerized systems hosted by the CPE devices, to facilitate telemetry, as described elsewhere herein. In some implementations, network controller 280 may correspond to network controller 122, described above.

Network 290 includes one or more wired and/or wireless networks. For example, network 290 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in FIG. 2 are provided as an example. In practice, there may be additional devices, systems, and/or networks, fewer devices, systems, and/or networks, different devices, systems, and/or networks, or differently arranged devices, systems, and/or networks than those shown in FIG. 2. Furthermore, two or more devices and/or systems shown in FIG. 2 may be implemented within a single device and/or system, or a single device and/or system shown in FIG. 2 may be implemented as multiple, distributed devices and/or systems. Additionally, or alternatively, a set of devices and/or systems (e.g., one or more devices and/or systems) of environment 200 may perform one or more functions described as being performed by another set of devices and/or systems of environment 200.

Figure 3:
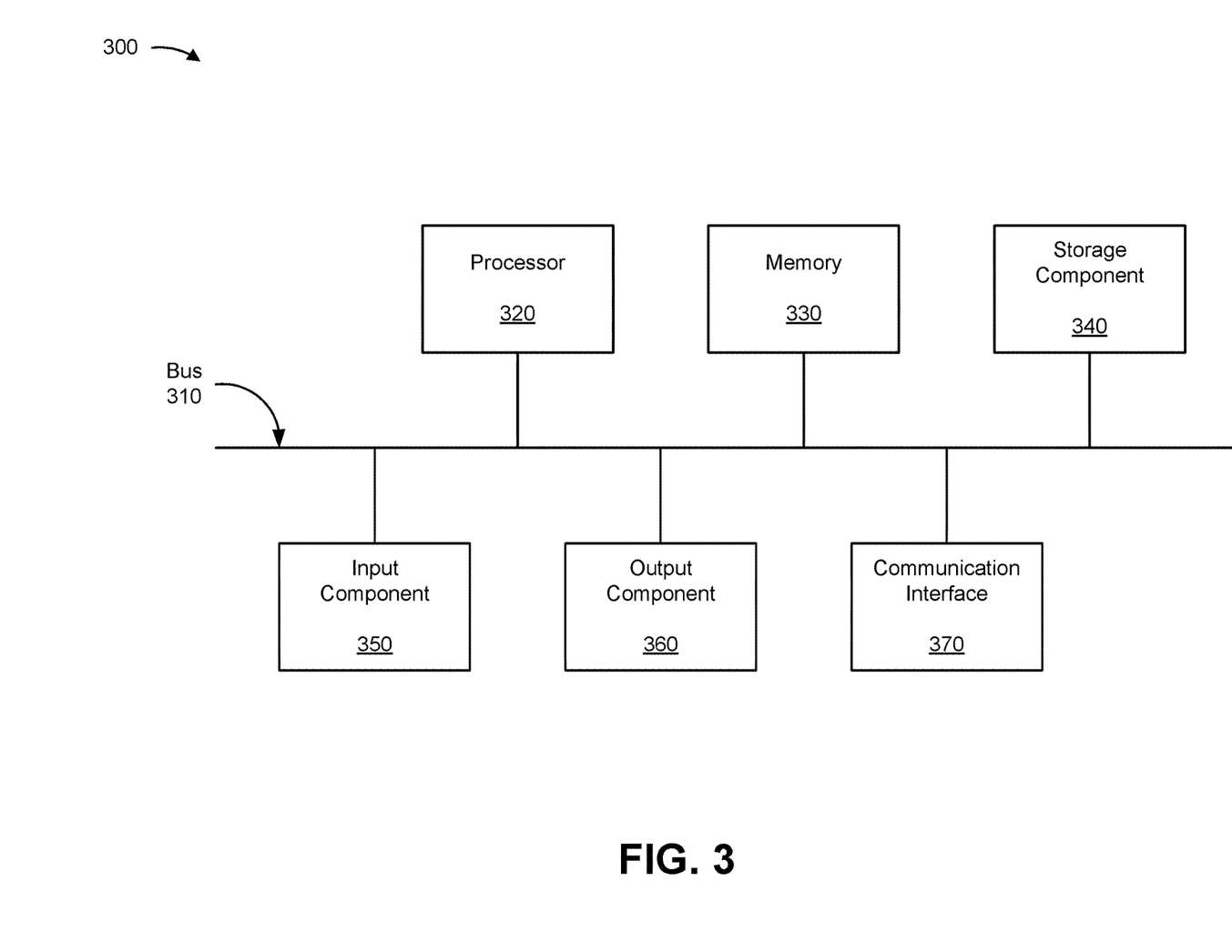
FIG. 3 is a diagram of example components of one or more devices of FIG. 2.

FIG. 3 is a diagram of example components of a device 300. Device 300 may correspond to CPE device 210, hub system 220, transport system 230, edge system 240, core network system 250, management platform 260, and/or network controller 280. In some implementations, CPE device 210, hub system 220, transport system 230, edge system 240, core network system 250, management platform 260, and/or network controller 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, haptic feedback, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, a powerline interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
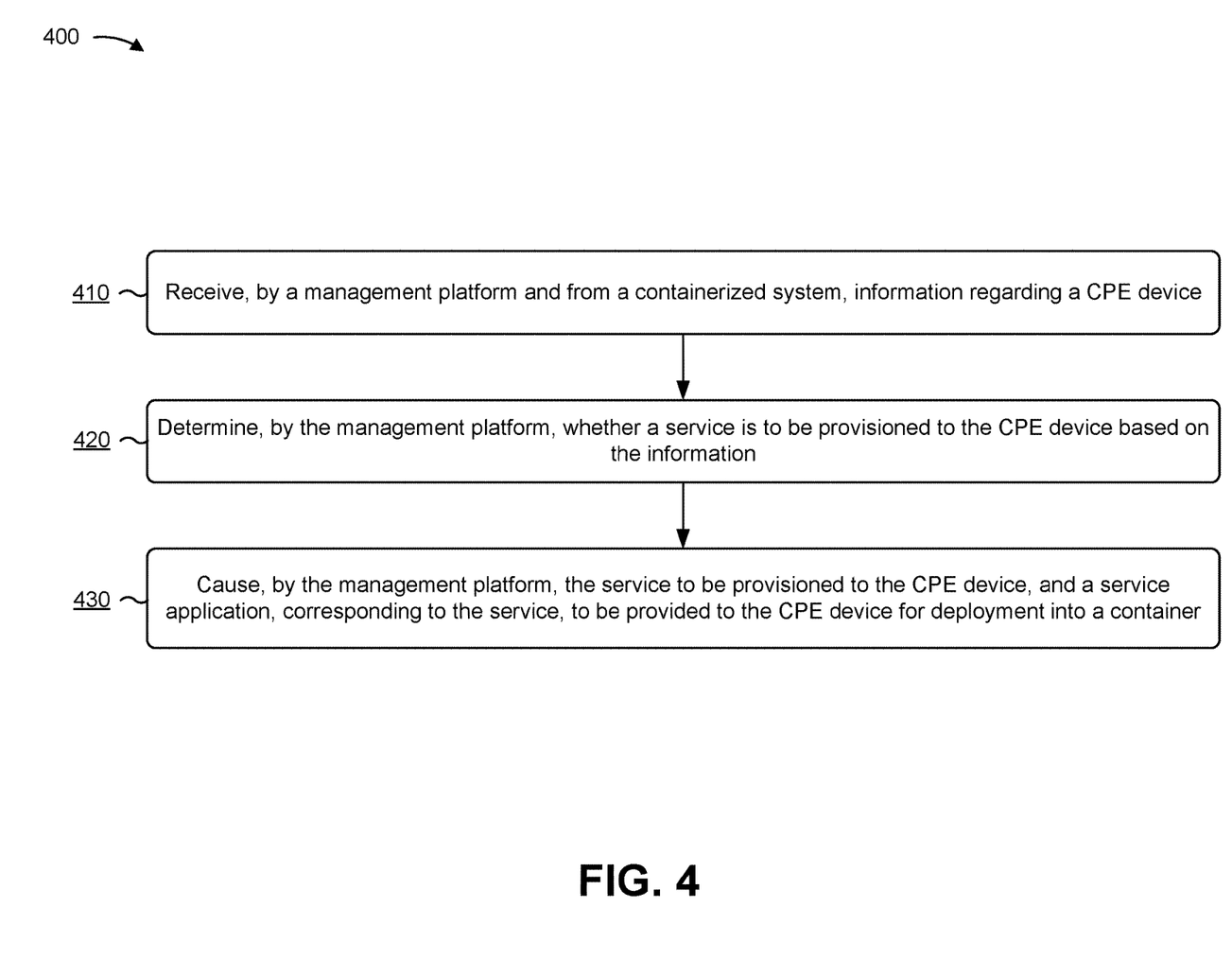
FIG. 4 is a flow chart of an example process for provisioning a service, and deploying a corresponding service application, to a containerized system.

FIG. 4 is a flow chart of an example process 400 for provisioning a service, and deploying a corresponding service application, to a containerized system. In some implementations, one or more process blocks of FIG. 4 may be performed by a management platform (e.g., management platform 260). In some implementations, one or more process blocks of FIG. 4 may be performed by another device or a group of devices separate from or including the management platform, such as CPE device 210, hub system 220, transport system 230, edge system 240, core network system 250, and/or network controller 280. In some implementations, a system may include a containerized system hosted by a CPE device (e.g., CPE device 210). In some implementations, the containerized system may include an operating system and a plurality of containers configured to share resources of the operating system. In some implementations, each container, of the plurality of containers, may be configured to contain a respective service application. In some implementations, the system may include the management platform. In some implementations, the management platform may be configured to communicatively couple to the containerized system over a network (e.g., network 290) provided by a network service provider. In some implementations, the management platform may include one or more memories, and one or more processors, communicatively coupled to the one or more memories, configured to perform process 400.

As shown in FIG. 4, process 400 may include receiving, from the containerized system, information regarding the CPE device (block 410). For example, the management platform (e.g., using computing resource 272, processor 320, memory 330, storage component 340, input component 350, communication interface 370, and/or the like) may receive, from the containerized system, information regarding the CPE device, as described above in connection with FIGS. 1A-1C.

As further shown in FIG. 4, process 400 may include determining whether a service is to be provisioned to the CPE device based on the information (block 420). For example, the management platform (e.g., using computing resource 272, processor 320, memory 330, storage component 340, and/or the like) may determine whether a service is to be provisioned to the CPE device based on the information, as described above in connection with FIGS. 1A-1C.

As further shown in FIG. 4, process 400 may include causing the service to be provisioned to the CPE device, and a service application, corresponding to the service, to be provided to the CPE device for deployment into a container, of the plurality of containers, based on determining that the service is to be provisioned to the CPE device (block 430). For example, the management platform (e.g., using computing resource 272, processor 320, memory 330, storage component 340, output component 360, communication interface 370, and/or the like) may cause the service to be provisioned to the CPE device, and a service application, corresponding to the service, to be provided to the CPE device for deployment into a container, of the plurality of containers, based on determining that the service is to be provisioned to the CPE device, as described above in connection with FIGS. 1A-1C.

Process 400 may include additional implementations, such as any single implementation or any combination of implementations in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
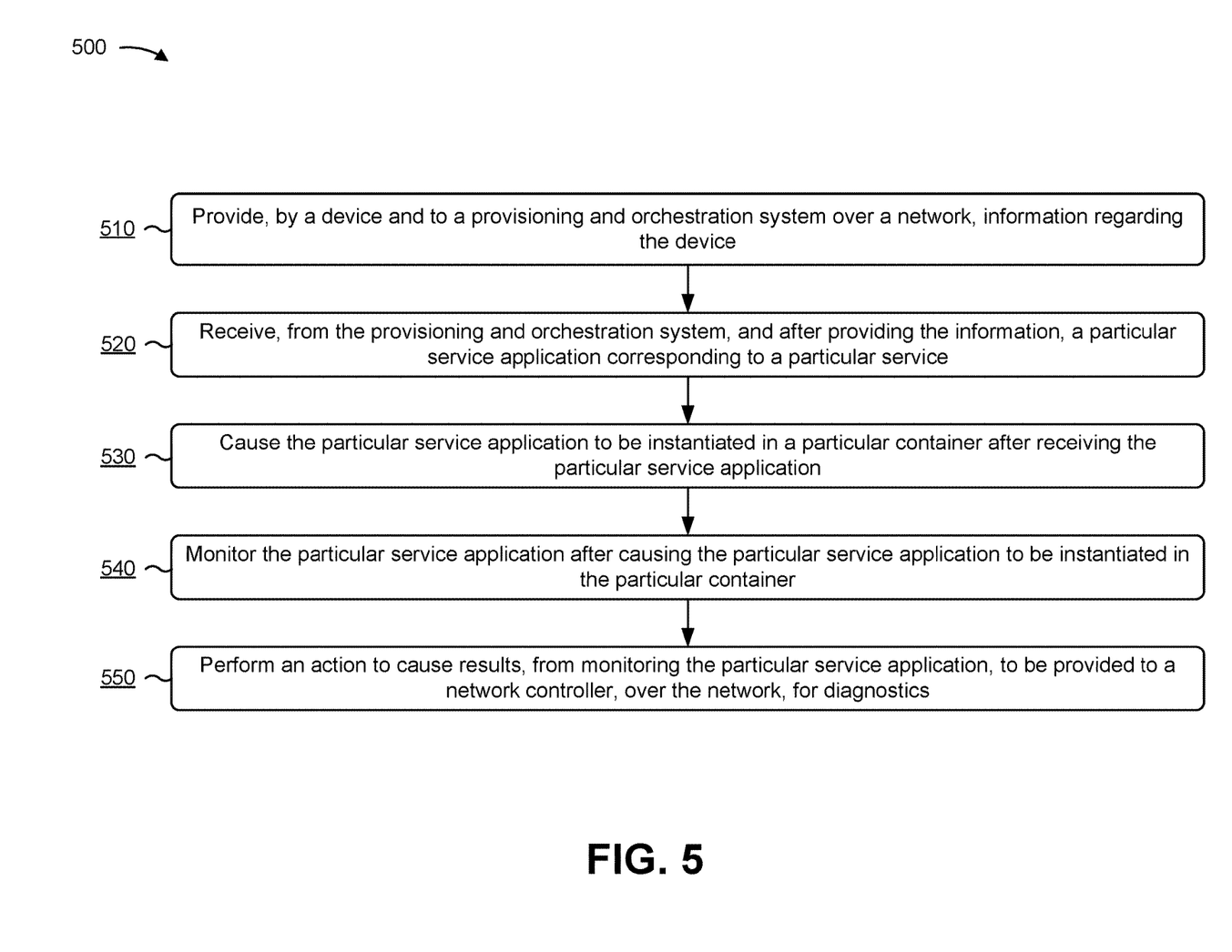
FIG. 5 is a flow chart of an example process for facilitating provisioning of a service, and deployment of a corresponding service application, in a containerized system.

FIG. 5 is a flow chart of an example process 500 for facilitating provisioning of a service, and deployment of a corresponding service application, in a containerized system. In some implementations, one or more process blocks of FIG. 5 may be performed by a device (e.g., a CPE device 210). In some implementations, one or more process blocks of FIG. 5 may be performed by another device or a group of devices separate from or including the device, such as hub system 220, transport system 230, edge system 240, core network system 250, management platform 260, and/or network controller 280.

As shown in FIG. 5, process 500 may include providing, to a provisioning and orchestration system over a network (e.g., network 290) provided by a network service provider, information regarding the device, the device hosting a containerized system that includes an operating system and a plurality of containers that share resources of the operating system, each container, of the plurality of containers, being configured to contain a respective service application, and the provisioning and orchestration system being configured to facilitate deployment of updates, or facilitate provisioning of services and deployment of service applications corresponding to the services (block 510). For example, the device (e.g., using processor 320, memory 330, storage component 340, output component 360, communication interface 370, and/or the like) may provide, to a provisioning and orchestration system over a network provided by a network service provider, information regarding the device, as described above in connection with FIGS. 1A-1C. In some implementations, the device may host a containerized system that includes an operating system and a plurality of containers that share resources of the operating system. In some implementations, each container, of the plurality of containers, may be configured to contain a respective service application. In some implementations, the provisioning and orchestration system may be configured to facilitate deployment of updates, or to facilitate provisioning of services and deployment of service applications corresponding to the services.

As further shown in FIG. 5, process 500 may include receiving, from the provisioning and orchestration system, and after providing the information, a particular service application corresponding to a particular service (block 520). For example, the device (e.g., using processor 320, memory 330, storage component 340, input component 350, communication interface 370, and/or the like) may receive, from the provisioning and orchestration system, and after providing the information, a particular service application corresponding to a particular service, as described above in connection with FIGS. 1A-1C.

As further shown in FIG. 5, process 500 may include causing the particular service application to be instantiated in a particular container, of the plurality of containers, after receiving the particular service application (block 530). For example, the device (e.g., using processor 320, memory 330, storage component 340, and/or the like) may cause the particular service application to be instantiated in a particular container, of the plurality of containers, after receiving the particular service application, as described above in connection with FIGS. 1A-1C.

As further shown in FIG. 5, process 500 may include monitoring the particular service application after causing the particular service application to be instantiated in the particular container (block 540). For example, the device (e.g., using processor 320, memory 330, storage component 340, communication interface 370, and/or the like) may monitor the particular service application after causing the particular service application to be instantiated in the particular container, as described above in connection with FIGS. 1A-1C.

As further shown in FIG. 5, process 500 may include performing an action to cause results, from monitoring the particular service application, to be provided to a network controller (e.g., network controller 280), over the network, for diagnostics (block 550). For example, the device (e.g., using processor 320, memory 330, storage component 340, output component 360, communication interface 370, and/or the like) may perform an action to cause results, from monitoring the particular service application, to be provided to a network controller, over the network, for diagnostics, as described above in connection with FIGS. 1A-1C.

Process 500 may include additional implementations, such as any single implementation or any combination of implementations in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a network service provider may implement a software architecture that is common to (e.g., the same for) a variety of hardware devices, and that can be tailored to meet customer needs across multiple service segments (e.g., fiber optic-based Internet service, low-cost Internet service, 5G fixed wireless service, NB-IoT service, LTE Cat-M1-based service, and/or the like). This permits a network service provider to develop, and utilize, a common BSS, a common OSS, a common telemetry solution, and/or a common surveillance solution, across all service segments, which simplifies the development of new protocols, network management functionalities, operational services features, and/or the like, thereby improving overall deployment efficiency.

Containerization also provides a standalone environment, which enables flexible deployment of core and/or add-on functionality (e.g., since software code changes are not needed when new hardware devices are introduced, or when a certain hardware component, such as a processor core, is changed). This allows for flexibility from a design perspective and agility from a deployment perspective, and an overall more flexible CPE device lifecycle.

The capability of supporting add-on services (e.g., microservices), in conjunction with a management platform that facilitates provisioning of such services and deployment of corresponding service applications, as well as deployment of core functionality updates for containerized systems, also provides a more flexible approach to the embedded software development cycle (since containerization abstracts service applications away from hardware dependencies).

Further, dynamic telemetry permits a network service provider to proactively identify issues relating to a subscriber's services, and provide appropriate notifications to the subscriber and/or to technical support team(s). Communicating performance-impacting events to subscribers provides a paradigm shift in service levels, since a subscriber may be made aware of a network outage and/or the like without having to contact customer support (and endure through a time-intensive diagnosis of the outage). This provides improved segmentation, and diagnoses, of service-related issues, which allows for more efficient issue resolution.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A customer premises equipment (CPE) device, comprising:
   one or more memories;
   one or more processors communicatively coupled to the one or more memories; and
   a communication component communicatively coupled to the one or more processors and the one or more memories,
      the communication component being configured to communicatively couple to a network,
      the CPE device hosting a containerized system that includes an operating system, a common data store, and a plurality of containers configured to share resources of the operating system,
         each container of the plurality of containers being configured to contain a respective service application,
      the operating system being configured to communicate, using the one or more processors and the communication component, with a management platform of the network, to coordinate receiving of updates for the containerized system or the CPE device and deployment of service applications to the CPE device,
      the operating system being configured to instantiate a telemetry model for the service applications by instantiating one or more parametric objects or key performance indicator (KPI) thresholds associated with the service applications,
         the one or more parametric objects or the KPI thresholds being stored in the common data store of the containerized system when the containerized system is configured in CPE device,
         the telemetry model to monitor the service applications based on the deployment of the service applications to the CPE device, and
         the telemetry model being specific to capabilities of the CPE device and the service applications, and
      the operating system being configured to provide information regarding a status of the service applications by providing telemetry data relating to the parametric objects or the KPI thresholds and based on monitoring the service applications.

2. The CPE device of claim 1, wherein the containerized system further includes:
   a container host layer configured to facilitate use of containerized objects and/or discontinued use of the containerized objects.

3. The CPE device of claim 1, wherein the containerized system further includes:
   the common data store accessible to the plurality of containers; and
   wherein the one or more processors are configured to update the common data store based on the updates or the service applications.

4. The CPE device of claim 1, wherein the operating system includes:
   a hardened operating system.

5. The CPE device of claim 1, wherein the containerized system further includes:
   a hardened kernel configured to provide the operating system with access to common device drivers.

6. The CPE device of claim 1, wherein the network includes a telecommunications network; and
   wherein the CPE device is configured for use with the telecommunications network.

7. The CPE device of claim 1, wherein the communication component is configured to communicatively couple to the network to receive:
   a fiber optic-based Internet service;
   a low-cost internet (LCI) service;
   a Narrowband Internet-of-Things (NB-IoT) service;
   a low power wide area (LPWA) service;
   a fixed wireless service; or
   a Data Over Cable Service Interface Specification (DOCSIS)-based network service.

8. A system comprising a containerized system hosted by a customer premises equipment (CPE) device, the containerized system including an operating system, a common data store, and a plurality of containers configured to share resources of the operating system, each container, of the plurality of containers, being configured to contain a respective service application, the system comprising:
   a management platform configured to communicatively couple to the containerized system over a network,
   the management platform including:
      one or more memories, and
      one or more processors, communicatively coupled to the one or more memories, configured to:
         receive, from the containerized system, information regarding the CPE device,
         determine whether a service is to be provisioned to the CPE device based on the information,
         cause the service to be provisioned to the CPE device, and a service application, corresponding to the service, to be provided to the CPE device for deployment into a container, of the plurality of containers, based on determining that the service is to be provisioned to the CPE device,
         instantiate a telemetry model for the service application by instantiating one or more parametric objects or key performance indicator (KPI) thresholds associated with the service application, the one or more parametric objects or the KPI thresholds being stored in the common data store of the containerized system when the containerized system is configured in CPE device, the telemetry model to monitor the service application based on the deployment of the service application, and the telemetry model being specific to capabilities of the CPE device and the service application, and provide, to a network controller over the network, information regarding a status of the service application by providing telemetry data relating to the parametric objects or the KPI thresholds and based on monitoring the service application.

9. The system of claim 8, wherein the management platform is implemented in a cloud computing environment.

10. The system of claim 8, wherein the information includes data identifying:
a hardware configuration of the CPE device, or
a configuration of the containerized system.

11. The system of claim 8, further comprising:
an operations support system (OSS); and
wherein the one or more processors, when determining whether the service is to be provisioned to the CPE device, are configured to:
provide, to the network controller, the information for analysis by the OSS,
receive, from the network controller, operational configuration data, relating to the CPE device, provided by the OSS based on the analysis, and
process the operational configuration data.

12. The system of claim 8, further comprising:
a business support system (BSS); and
wherein the one or more processors are further configured to:
provide, to the network controller, the information for analysis by the BSS,
receive, from the BSS, an instruction to provide, to the containerized system, one or more updates for the containerized system or the CPE device, and
cause the one or more updates to be provided to the containerized system for installation.

13. The system of claim 8, wherein
the network controller is configured to provide, to the containerized system, the parametric objects, and the KPI thresholds; and
wherein the containerized system is configured to:
receive, from the network controller, the parametric objects, and the KPI thresholds,
monitor the service application, during execution of the service application, based on the parametric objects and the KPI thresholds.

14. The system of claim 8, wherein the service includes:
a parental control service;
a network management service;
a digital assistant service;
a streaming service;
an Internet-of-Things (IoT) service;
a media service;
a content distribution service;
a security service; or
a voice service.

15. The system of claim 8, wherein the CPE device includes:
a voice service module;
a digital assistant module;
a Wi-Fi module;
a femtocell module;
a picocell module;
a video module; or
an Internet-of-Things (IoT) module.

16. A method, comprising:
providing, by a device and to a provisioning and orchestration system over a network, information regarding the device,
the device hosting a containerized system that includes an operating system, a common data store, and a plurality of containers that share resources of the operating system,
each container, of the plurality of containers, being configured to contain a respective service application,
the provisioning and orchestration system being configured to:
facilitate deployment of updates, or
facilitate provisioning of services and deployment of service applications corresponding to the services;
receiving, by the device, from the provisioning and orchestration system, and after providing the information, a particular service application corresponding to a particular service;
causing, by the device, the particular service application to be instantiated in a particular container, of the plurality of containers, after receiving the particular service application;
instantiating, by the device, a telemetry model by instantiating one or more parametric objects or key performance indicator (KPI) thresholds associated with the particular service application after causing the particular service application to be instantiated,
the telemetry model being specific to capabilities of the device and the particular service application, and
the one or more parametric objects or the KPI thresholds being stored in the common data store of the containerized system when the containerized system is configured in CPE device;
monitoring, by the device, performance of the particular service application using the telemetry model based on the parametric objects or the KPI thresholds; and
performing, by the device, an action to cause results, from monitoring the particular service application, to be provided to a network controller, over the network, for diagnostics.

17. The method of claim 16, wherein the device includes:
a router module;
a wide area network (WAN) module;
a wireless local area network (WLAN) module;
a video module;
a voice services module;
an Internet-of-Things (IoT) module;
a digital assistant module; or
a content recorder module.

18. The method of claim 16, further comprising:
receiving, from the network controller, an instruction concerning the particular service application; and
wherein monitoring the particular service application is based on the instruction.

19. The method of claim 16, wherein the results include measurements relating to the parametric objects, and the KPI.

20. The method of claim 16, wherein the particular service includes:
- a parental control service;
- a network management service;
- a security service;
- a digital assistant service;
- a voice service;
- a streaming service;
- an Internet-of-Things (IoT) service;
- a media service; or
- a content distribution service.

* * * * *